United States Patent [19]

Gross

[11] 3,781,121

[45] Dec. 25, 1973

[54] STABILIZED LIGHT BEAM PROJECTION SYSTEM

[75] Inventor: Richard A. Gross, San Jose, Calif.

[73] Assignee: Mark Systems, Inc., Cupertino, Calif.

[22] Filed: June 22, 1970

[21] Appl. No.: 48,395

[52] U.S. Cl. .............................................. 356/247
[51] Int. Cl. .............................................. G01c 9/02
[58] Field of Search ................... 240/2 F, 44.26; 350/10, 16; 356/148, 149, 247, 248, 250, 251

[56] References Cited
UNITED STATES PATENTS

| 3,446,980 | 5/1969 | Meier | 350/16 |
| 2,341,189 | 2/1944 | Morris | 240/2 F |
| 2,959,088 | 11/1960 | Rantsch | 356/240 |
| 3,522,993 | 8/1970 | Gabriet | 350/16 |

Primary Examiner—William L. Sikes
Attorney—Townsend and Townsend

[57] ABSTRACT

A laser stabilizing system having an inertially stabilized projection lens mounted for pivotal movement about its focal point. A light source, such as a laser, and means for focusing the light emitted therefrom to a real or virtual point image at the focal point of the projection lens are provided. A spotting telescope having a reticle pattern superimposed upon the image visible therethrough, the reticle pattern being optically coupled to the output direction of the device may also be provided.

10 Claims, 8 Drawing Figures

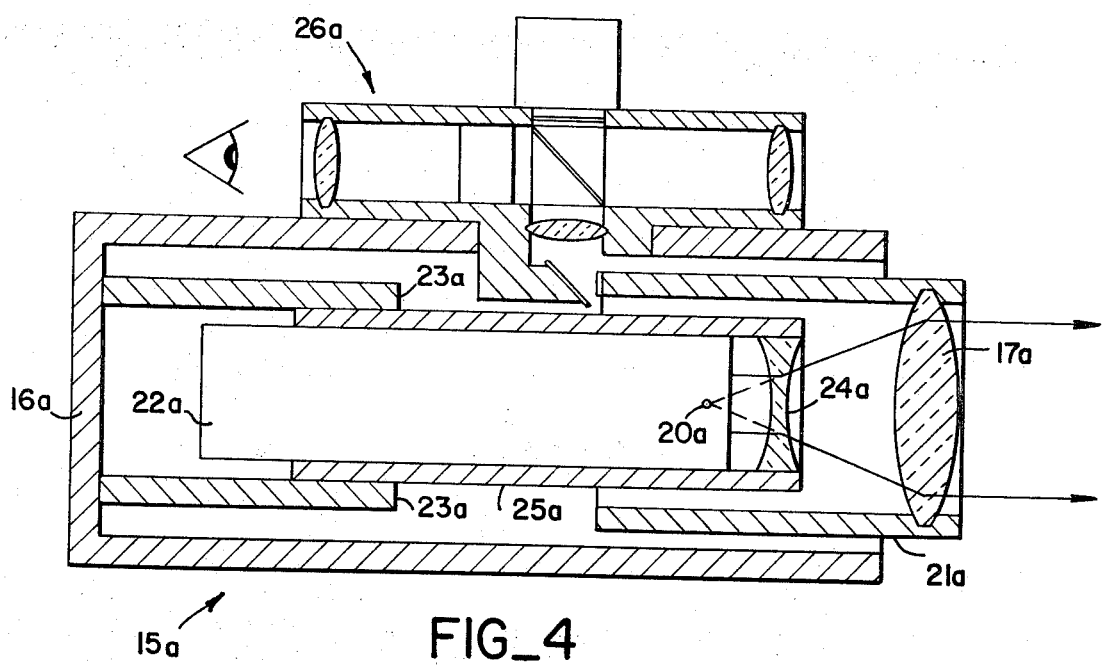
FIG_4
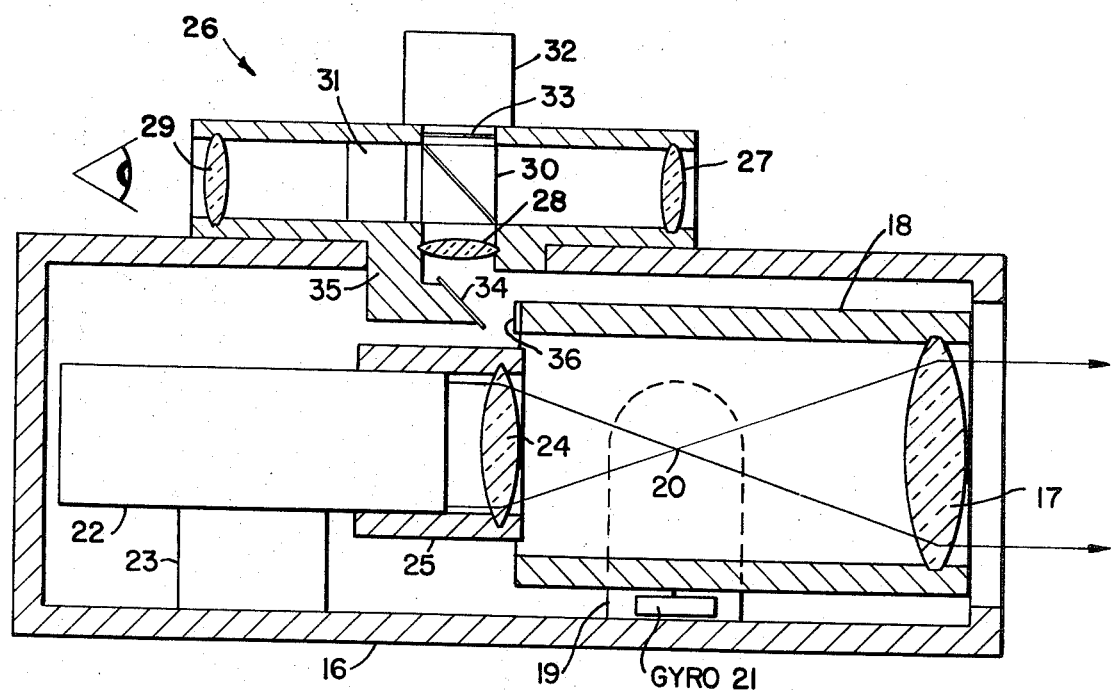
FIG_1
INVENTOR.
RICHARD A. GROSS
BY
Townsend and Townsend
ATTORNEYS

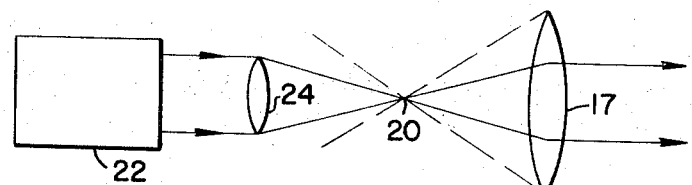
FIG_2a
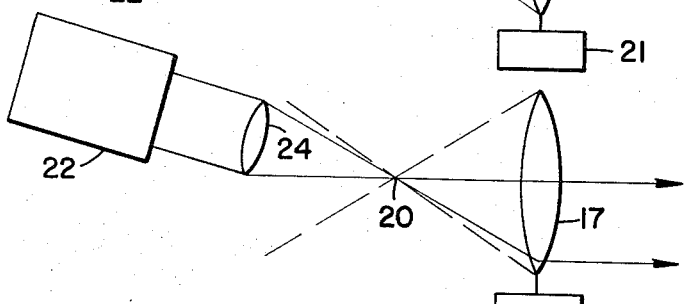
FIG_2b
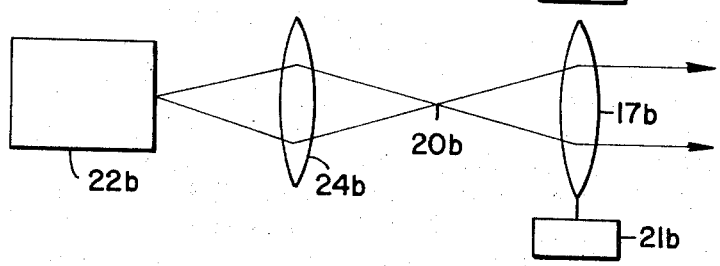
FIG_5
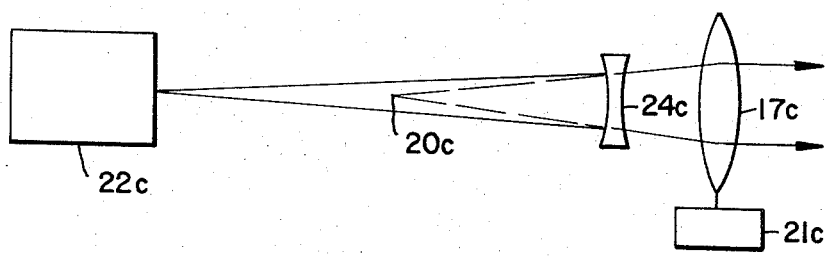
FIG_6
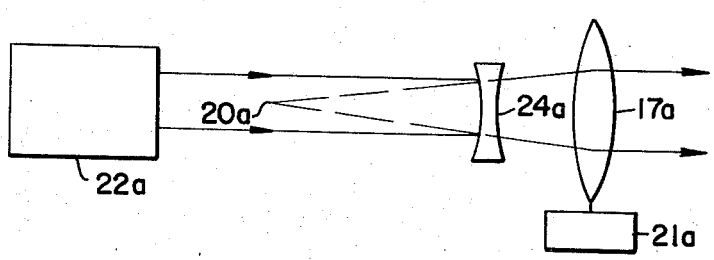
FIG_3
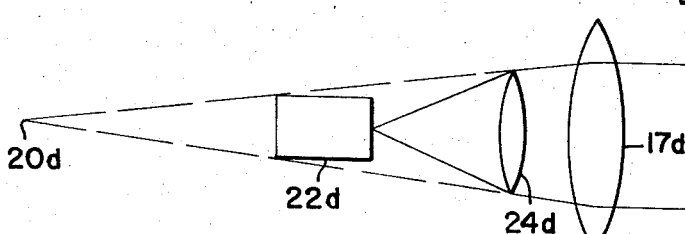
FIG_7
INVENTOR.
RICHARD A. GROSS
BY
Townsend and Townsend
ATTORNEYS

STABILIZED LIGHT BEAM PROJECTION SYSTEM

This invention relates to a laser stabilizing system.

An object of the present invention is to provide a collimated light source in which the collimated beam emitted therefrom is stabilized despite accidental motion or vibration of the device. The invention is thus particularly applicable to hand-held apparatus or apparatus mounted on moving systems.

Another object of the present invention is to provide a stabilized collimated light source having a spotting or aiming telescope in which a reticle pattern is provided, the reticle pattern being stabilized and thus coincident with the collimated light beam emitted therefrom.

These objects are met in accordance with the present invention by providing an inertially stabilized projection lens mounted for pivotal movement about its focal point. The pivot point for such rotation is provided, for example, by the mutual orthogonal mounting axes of the gyroscope gimbals. A light source, such as a laser, is disposed behind the projection lens, on the same side thereof as the pivot point, and means are provided for focusing the light emitted from the light source at said pivot point. The focusing means may comprise one or more lenses adapted to focus the particular type of light source employed, either collimated or point, at the pivot point of the projection lens. Furthermore, the focusing means may provide either a real or virtual point image of the light source at said pivot point.

Additionally, a spotting or aiming telescope having a reticle pattern optically coupled to the output of the light beam may be provided. The telescope includes a beam splitter and a pair of objective lenses, and is rigidly attached to the device. The first objective lens is suitably oriented so that the image visible therethrough will include the preferred axis of the output beam of the device. Suitable optics are provided to image a reticle pattern through the second objective lens of the telescope, the image of the reticle being coupled to the projection lens of the device, so that as the device is reoriented, the image of the reticle will appear to move coincidentally with the output beam. Thus, the reticle will always lie over the point in space which is illuminated by the output beam.

Thus, the invention generally contemplates stabilizing the output beam of a laser or other suitable light source by mounting an inertially stabilized projection lens for rotational movement about is focal point, and providing a point image, either real or virtual, of the light source at the pivot point of the projection lens. Furthermore, a spotting telescope having a reticle pattern superimposed upon the image visible therethrough, the reticle pattern being optically coupled to the output direction of the device, may be provided.

The foregoing is advantageous for providing a collimated light projection device, wherein the light beam is angularly stabilized despite accidental motion or vibration of the device, the device being capable of being readily aimed due to the provision of the reticle pattern optically coupled to the output direction of the device.

These and other objects, features and advantages of the present invention will be more readily apparent from the following detailed description of the present invention with reference to the accompanying drawings, wherein:

FIG. 1 is a side cross-sectional view of a laser projection device embodying the present invention;

FIGS. 2a and 2b are diagrammatic views of the apparatus depicted in FIG. 2;

FIG. 3 is a diagrammatic view of an alternative embodiment of the present invention;

FIG. 4 is a side cross-sectional view of the apparatus depicted in FIG. 3; and

FIGS. 5, 6 and 7 are diagrammatic views of other embodiments of the present invention.

Referring initially to FIG. 1, there is provided a stabilized collimated light source 15 having a case or housing 16. A projection lens 17 is disposed within housing 16 adjacent an opening therein. Projection lens 17 is mounted in the end of a lens tube 18, lens tube 18 being pivotally mounted in two axes by a gimbal 19. Projection lens 17 is spaced a distance from the effective pivot point 20 of gimbal 19 corresponding to the focal length of projection lens 17. In this manner, projection lens 17 is pivotally mounted about its focal point.

Lens tube 18 is suitably connected to a gyroscope 21 to inertially stabilize projection lens 17 about effective pivot point 20. Typical apparatus for coupling lens tube 18 to gyroscope 20 is disclosed in U.S. Patent Application entitled "Optical Device Gyro-Linkage System," Ser. No. 757,252, filed Sept. 4, 1968, and having a common assignee herewith. Of course, inertial stabilization of projection lens 17 about its focal point 20 may be accomplished in an alternative conventional manner.

A laser or other collimated light source 22 is disposed within housing 16, and is mounted thereto by a support 23. A focusing lens 24 is mounted to laser 22 by a collar 25. Focusing lens 24 is oriented with its axis parallel to the collimated beam emitted from laser 22, so that the beam is focused at the focal point of focusing lens 24. Furthermore, focusing lens 24 is suitably located so that the focal point thereof will substantially coincide with effective pivot point 20.

Since all light passing through the focal point of a lens exits that lens parallel to the axis thereof, it is apparent that the light passing through effective pivot point 20 will exit projection lens 17 parallel to the axis thereof, and thus in a collimated fashion. Since focusing lens 24 focuses the beam emitted by laser 22 at effective pivot point 20, it is thus apparent that the beam emitted from laser 22 will exit projection lens 17 as a collimated beam parallel to the axis thereof. Furthermore, since projection lens 17 is stabilized with respect to inertial space, and thus maintains a fixed relationship therewith, the beam emitted therefrom will be stabilized despite displacement of laser 22 and focusing lens 24 caused by vibration or accidental movement of case 16.

Preferably, but not necessarily, focusing lens 24 has a smaller cone angle, subtended at the focal point 20 than projection lens 17, so that the entire beam of laser 22 will be within the cone of projection lens 17 despite angular displacement thereof.

Referring now to FIGS. 2a and 2b, there is diagrammatically depicted therein the optics of the apparatus shown in FIG. 1. Specifically, FIG. 2a shows the apparatus of FIG. 1 in its initial or undisplaced configuration, in which the axes of laser 22, focusing lens 24 and projection lens 17 are substantially coincident. Angular displacement of the device will produce the condition depicted in FIG. 2b, in which the optical axes of focusing lens 24 and laser 22 are at an angle to the optical axis of projection lens 17. As is apparent from FIG. 2b, the beam emitted from projection lens 17 remains parallel to the optical axis thereof, the beam being translated a small distance from the optical axis. However, this translation is insignificant in comparision with the beam widening effects due to diffraction and atmospheric turbulence.

Referring again to FIG. 1, there is also provided a spotting or aiming telescope, shown generally at 26, having a pair of objective lenses 27 and 28 and a single viewing lens 29. A beam splitter 30 is disposed between viewing lens 29 and objective lenses 27 and 28, so that the image observed through viewing lens 29 will be a superimposition of the images visible through objective lenses 27 and 28. An erector 31 is provided between viewing lens 29 and beam splitter 30 to erect the images observed therethrough in a conventional manner.

Viewing lens 29 and objective lens 27 are suitably oriented so that the image observed therethrough is coincident with the optical axis of projection lens 17 in it undisplaced or preferred configuration. Of course, since telescope 26 is fixedly mounted to housing 16, the center of the image visible therethrough will differ somewhat from the beam location of the device upon angular displacement. However, a reticle pattern visible through objective lens 28 is provided, the reticle pattern being stabilized with respect to the emitted beam path. This is accomplished by providing a light source 32 which illuminates a reticle pattern 33. Light source 32 and reticle pattern 33 are disposed adjacent beam splitter 30, reticle pattern 33 being at the focal point of objective lens 28, so that the reticle pattern will be projected through objective lens 28 onto a first mirror 34, which is attached to housing 16 by a support 35. Mirror 34 is suitably oriented to reflect the reticle pattern impinging thereon onto a second mirror 36. Mirror 36 is fixedly mounted to lens tube 18, and is oriented to reflect the reticle image impinging thereon back to first mirror 34, once again through objective lens 28, then to beam splitter 30, and then through the erector 31, causing the reticle image finally to be visible through viewing lens 29. The reticle pattern will thus be visible through viewing lens 29, superimposed upon the image visible through objective lens 27.

Since reticle pattern 33 is disposed at the focal image plane of objective lens 28, the reticle image is transmitted to mirrors 34 and 36 in the form of collimated light. As the device is angularly displaced, a second mirror 36 will be reoriented with respect to first mirror 34, causing the rays reflecting from second mirror 36 to be redirected by twice the angle by which the device is displaced. Accordingly, objective lenses 27 and 28 are of suitable focal lengths and locations so the the magnification of the telescope formed by viewing lens 29 and the objective lens 27 is twice that of the telescope formed by viewing lens 29 and objective lens 28. In this manner, the angular deflection of the reticle forming beam by second mirror 36 will cause the image of the reticle pattern visible through viewing lens 29 to appear superimposed upon the location in space illuminated by the beam emitted from the device. Furthermore, since the reticle image is transmitted in the form of collimated light, the reticle image will remain in focus for all angular displacements of the device. Thus, the reticle will always appear as a sharp image superimposed upon the point in space at which the beam emitted from the device impinges.

Preferably, but not necessarily, the reticle pattern provided is that of concentric circles, so as to enable the operator to observe and determine not only the beam position in space, but its spread.

The foregoing spotting telescope and reticle apparatus is advantageous in that it requires no mechanical or electrical coupling to the gyro, the reticle pattern image being positioned by a small, light weight mirror which may be attached anywhere to the inertially stabilized projection lens 17, lens tube 18 or gyro 21, perpendicular to the gyro axis. Furthermore, optical coupling is accomplished through collimated light, therefore providing constant focus and eliminating translatory vibration effects. In addition, the reticle pattern and light source are suitably disposed to readily permit replacement or alignment thereof.

Referring now to FIG. 3, an alternative embodiment of the present invention will now be described. A projection lens 17a is pivotally mounted about its focal point 20a, and is inertially stabilized by a gyro 21a, substantially as described with respect to the embodiment depicted in FIGS. 1, 2a and 2b. Since the essence of the present invention is to provide a point image, either real or virtual, of the light source at focal point 20a, this may be accomplished by providing a biconcave or negative lens 24a, disposed between focal point 20a and projection lens 17a, with its virtual focal point coincident with focal point 20a. A laser or other collimated light source 22a is oriented so that the beam emitted therefrom impinges upon negative lens 24a, causing a virtual or imaginary point image thereof to appear at focal point 20a. As is apparent from FIG. 3, the same result as that described with respect to the embodiment depicted in FIGS. 1, 2a and 2b will thus be achieved.

Referring to FIG. 4, an implementation of the embodiment depicted in FIG. 3 will now be described. Stabilized collimated light source 15a includes a case or housing 16a. Projection lens 17a is disposed within housing 16a adjacent an opening therein. Projection lens 17a is mounted in the end of an annularly cylindrical or "inside-out" gyro 21a, having its rotating member outside a hollow inner core. Gyro 21a is suitably mounted for pivotal movement about an effective pivot point 20a, projection lens 17a being disposed at a distance therefrom so that its focal point is coincident therewith. A laser or other collimated light source 22a is disposed within housing 16a and is mounted thereto by a plurality of supports 23a. A bi-concave or negative lens 24a is mounted to laser 22a by a collar 25a. Negative lens 24a is oriented with its axis parallel to the collimated beam emitted from laser 22a and is disposed so that the virtual focal point thereof is coincident with pivot point 20a.

The construction thus disclosed is advantageous in that the gyro 21a is colinear with the optical axis of the device, and the distance required between laser 22a and projection lens 17a is substantially smaller than that required in the embodiment depicted in FIGS. 1, 2a and 2b, thus making the device more compact. Of course, the apparatus depicted in FIG. 4 may further include a spotting or aiming telescope 26a, as illustrated in FIG. 4, substantially identical to that described with respect to the embodiment depicted in FIG. 1.

While the present invention has been described with respect to particular embodiments employing collimated light sources, it is equally apparent that a point source, such as a GaAs laser, may be employed. Specifically, referring to FIG. 5, there is depicted an embodiment of the present invention employing a point source 22b. A projection lens 17b is pivotally mounted about its focal point 20b and is inertially stabilized by a gyro 21b, substantially as described with respect to the previously described embodiments. A focusing lens 24b is disposed between point source 22b and focal point 20b at a suitable location to focus the light emitted from point source 22b at focal point 20b. While the source 22b is a point source, in all other respects the theory and operation of the present embodiment is the same as that of the embodiment depicted in FIGS. 1, 2a and 2b.

Similarly, the embodiment depicted in FIGS. 3 and 4 may be readily adapted for use with a point source. Specifically, referring to FIG. 6, there is provided a projection lens 17c pivotally mounted about its focal point 20c, and inertially stabilized by a gyro 21c. A biconcave or negative lens 24c is disposed between focal point 20c and projection lens 17c. A point source 22c is provided, point source 22c and negative lens 24c being suitably disposed to provide a virtual or imaginary point image at focal point 20c. In all other respects, the theory and operation of the embodiment depicted in FIG. 6 is identical to that described with respect to the embodiment depicted in FIGS. 3 and 4.

An alternative embodiment of the present invention particularly adapted for use with a point source is depicted in FIG. 7. Once again, there is provided a projection lens 17d pivotally mounted for movement about its focal point 20d, and inertially stabilized by a gyro 21d. A positive focusing lens 24d is disposed between focal point 20d and projection lens 17d. A point source 22d is also disposed between focal point 20d and projection lens 17d, point source 22d and focusing lens 24d being suitably disposed to provide a virtual or imaginary point image at focal point 20d. It is apparent that the result thus obtained is the same as that obtained in the embodiment depicted in FIG. 6, namely the provision of a virtual image at the focal point of the projection lens, from a point source. However, a positive focusing lens 24d is employed, permitting the point source 22d to be located between focal point 20d and projection lens 17d. In other respects, the theory and operation of the embodiment depicted in FIG. 7 is identical to that described with respect to FIG. 6.

Referring again to FIG. 1, the operation of the present invention will now be described with reference to the embodiment depicted therein. Of course, this operation is substantially identical to that employed with all of the other embodiments of the present invention heretofore described. In operation, gyro 21 is initially caged, so that projection lens 17 will be oriented along its preferred or initial axis, as shown in FIG. 1. The operator of the device then sights through viewing lens 29, while moving the device until the center of the reticle pattern visible therethrough is superimposed upon the desired object to be illuminated. The operator then uncages gyro 21, causing projection lens 17 to thereafter be inertially stabilized in this aligned position. As previously described, the beam emitted therefrom will thereafter remain in this alignment, due to the inertial stabilization of projection lens 17. To select a new target, the gyro 21 need merely be recaged, and the procedures thus described repeated.

While particular embodiments of the present invention have been shown and described, it is apparent that modifications or adaptations may be made without departing from the true spirit and scope of the present invention, as set forth in the claims.

What is claimed is:

1. A stabilized collimated light source comprising a projection lens mounted for pivotal movement about its focal point, means for inertially stabilizing said projection lens, a light source and a negative lens disposed between said focal point and said projection lens, the virtual image point thereof being coincident with said focal point to provide a point image of said light source at said focal point.

2. A stabilized collimated light source comprising a projection lens mounted for pivotal movement about its focal point, means for inertially stabilizing said projection lens, a light source, focusing means for providing a point image of said light source at said focal point, and spotting telescope means for imaging the region in space containing the location at which the beam emitted from said projection lens impinges.

3. A stabilized collimated light source comprising a projection lens mounted for pivotal movement about it focal point, means for inertially stabilizing said projection lens, a light source, focusing means for providing a point image of said light source at said focal point, and spotting telescope means for imaging the region in space containing the location at which the beam emitted from said projection lens impinges, said spotting telescope means including means for superimposing a reticle pattern upon the image visible therethrough, the reticle pattern being at all times coincident with said location at which said beam impinges.

4. Apparatus according to claim 3 wherein said spotting telescope means comprises a viewing lens, a first objective lens oriented to image a region in space containing the location at which the beam emitted from said projection lens impinges, a second objective lens, beam splitter means disposed between said viewing lens and said objective lenses for superimposing the images visible through said objective lenses, an erector disposed between said viewing lens and said beam splitter means, a reticle pattern disposed at the focal point of said second objective lenses, means for illuminating said reticle pattern and inertially stabilized mirror means for reflecting the reticle image from said second objective lens to said second objective lens for observation through said viewing lens.

5. Apparatus according to claim 4 wherein said inertially stabilized mirror means comprises a mirror coupled to said projection lens perpendicular to the axis thereof.

6. Apparatus according to claim 5 wherein said first objective lens has twice the focal length of said second objective lens.

7. Apparatus according to claim 6 wherein the optical axes of said viewing lens and said first objective lens are coincident and the optical axis of said second objective lens is perpendicular to said optical axes.

8. A telescope having a stabilized reticle pattern comprising a viewing lens, a first objective lens oriented to image a region in space, a second objective lens, beam splitter means disposed between said viewing lens and said objective lenses for superimposing the images visible through said objective lenses, an erector disposed between said viewing lens and said beam splitter means, a reticle pattern disposed at the focal point of said second objective lens, means illuminating said reticle pattern, mirror means for reflecting the reticle image from said second objective lens to said second objective lens for observation through said viewing lens and means for inertially stabilizing said mirror means.

9. Apparatus according to claim 8 wherein said first objective lens has twice the focal length of said second objective lens.

10. Apparatus according to claim 9 wherein the optical axes of said viewing lens and said first objective lens are coincident and the optical axis of said second objective lens is perpendicular to said optical axes.

* * * * *